J. C. BIRD.
Wheel-Cultivator.
No. 65,719.
2 Sheets—Sheet 1
Patented June 11, 1867.
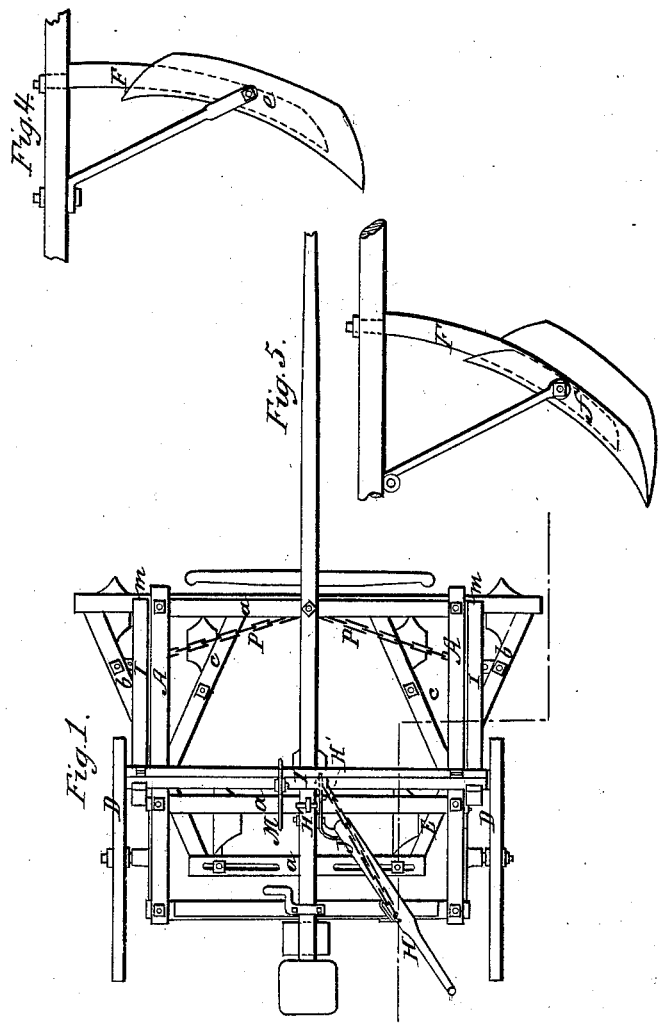
Witnesses.
Inventor.

J. C. BIRD.
Wheel-Cultivator.

Patented June 11, 1867.

Witnesses:
Geo. W. Rothwell
J. S. Lewis

Inventor:
Munn & Co
Attorneys for
Joseph C. Bird

United States Patent Office.

JOSEPH C. BIRD, OF RISING SUN, MARYLAND.

Letters Patent No. 65,719, dated June 11, 1867.

---

IMPROVEMENTS IN CULTIVATORS.

---

The Schedule referred to in these Letters Patent and making part of the same.

---

TO ALL WHOM IT MAY CONCERN:

Be it known that I, JOSEPH C. BIRD, of Rising Sun, in the county of Cecil, and State of Maryland, have invented a new and useful improvement in Cultivators; and I do hereby declare the following to be a full, clear, and exact description of the same, sufficient to enable one skilled in the art to which the invention appertains to make use of it, reference being had to the accompanying drawings which form a part of this specification, and in which—

Figure 1 is a top or plan view.

Figures 4 and 5 are views of forms of shares.

The improvements are in the mode of adjusting the share-frame, which is suspended from the front and rear respectively by levers pivoted on the carriage, and so arranged as to be used separately or in concert according to the varying necessities of the work; second, the arrangement of the two lifting levers, which give a parallel motion or vertical ascent to the share-frame, when the carriage is horizontal; third, the trapezoid-shaped harrow or cultivator-frame, consisting of the three parallel bars and the four angular pieces, arranged as described; fourth, the shares are formed double, without a weld pinched in at the middle to embrace the shank and flaring at the ends; fifth, the side shovel $b$, with a flange for securing it to the sheth and for the attachment of the brace rod.

Figure 3:
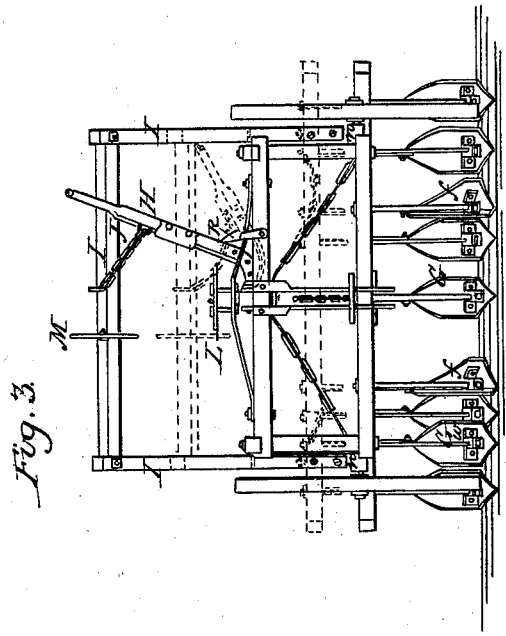
Figure 3 is a rear elevation.
Figure 2:
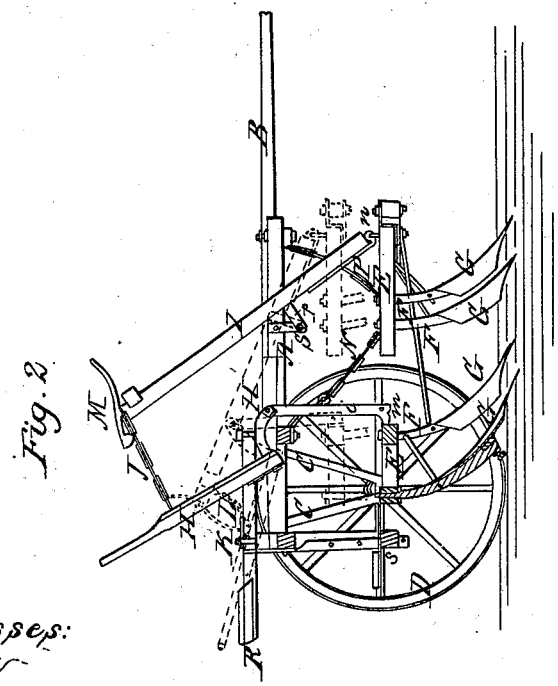
Figure 2 is a longitudinal vertical section.

In the drawing, the main frame A, with tongue B attached, is supported by the standards C upon the wheels D, the short axles being at the lower ends of the standards, avoiding interference with the rear of the cultivator-frame E, which is suspended at three points from the main frame A. The cultivator-frame, as appears most clearly in fig. 1, consists of three pieces, $a$ $a'$ $a''$, and four braces, $b$ $b$ $c$ $c$, which, when united, as shown, exhibit a trapezoid shape, and afford convenient points for the insertion of the shanks of the standards F, to which the cultivator teeth or shares G are attached. The cultivator teeth are of three forms, according to the uses for which they are intended, and are marked G, $e f$, the former being two-ended, and acting as the ordinary shovel or share, with the exception of being reversible. They are shown in figs. 1, 2, and 5. The shovels marked $e$ are made of a plate so doubled and pinched in the middle as to embrace the standard at that point, show flaring ends, and permit the brace to enclose it by a bolted stirrup, as in fig. 4. The tip of the standard, passing down below the bolt, comes in contact with the inner surfaces of the share $e$, and forms a point of support therefor. The shovel $f$, fig. 5, consists of a single curved plate with a flange, forming in the rear a curved recess, to be occupied by the standard of corresponding form, the bolt passing through the hole in the flange, and through the standard and brace forming the means of attachment of the share and brace to the standard. The cultivator-frame E is suspended from the main frame A at three points, $m$ $n$ $n$. At the former it is suspended from the link $i$ of the lever H, which is pivoted to the main frame, and at the points $n$ $n$, the cultivator is suspended from the pivoted frame I, which is pivoted also to a hanger on the main frame A. The lever H and frame I are capable of being used separately or together, being connected by a chain, J, which enables the vibration of the lever to be communicated to the frame. When thus operated simultaneously, the effect is to raise the cultivator-frame E equally, front and rear, but it may be raised irregularly by operation on the lever or frame singly, to raise or depress the rear or forward portion. The lever has a locking-catch, K, to maintain it in a depressed position when required, and the frame is similarly locked by the engagement of the trigger M with the bar L. It will be perceived that the lever H has a bent portion, H', from which the link $i$ depends, and also that the frame I has an arm, $p$, by which it is pivoted to the hanger on the frame A. The effect of these modes of suspension is that the cultivator-frame E is lifted or depressed vertically, as the lever H and frame I are vibrated, and not thrown forward and backward respectively as these motions occur. The upward position of the cultivator-frame is indicated in red lines, fig. 2. The chains P limit the downward range of the frame E. The power of the team is applied to the front of the cultivator, and the chain N transmits it to the frame A. A spring-seat, R, is provided for the driver, the lower bar S being a support for his feet. The shares G are attached to the standards F by means of the cast-iron blocks $w$. The shares are riveted on the blocks, the blocks socketed on the standard, and secured by set-screws.

Having described my invention, what I claim therein as new, and desire to secure by Letters Patent, is—

1. The arrangement of the share-frame E, supported from the lever H H', and pivoted frame I p, in such a manner as to lift vertically or independently as described.

2. The trapezoid-shaped cultivator-frame, consisting of the portions $a\ a\ a$, $b\ b$, $c\ c$, arranged substantially as described.

3. The share $e$, formed double, without a weld pinched in at the centre to embrace the standard F, and with flaring ends, in combination with the stirrup-brace, substantially as represented in fig. 4.

To the above specification of my improved cultivator I have signed my hand this 26th day of October, 1866.

JOSEPH C. BIRD.

Witnesses:
SOLON C. KEMON,
CHAS. D. SMITH.